(12) United States Patent
Crombrez

(10) Patent No.: US 6,719,379 B2
(45) Date of Patent: Apr. 13, 2004

(54) METHOD AND AN APPARATUS FOR BRAKING A VEHICLE

(75) Inventor: Dale Scott Crombrez, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,198

(22) Filed: Jun. 20, 2002

(65) Prior Publication Data

US 2003/0234577 A1 Dec. 25, 2003

(51) Int. Cl.$^7$ .................... B60T 13/74; G06F 19/00
(52) U.S. Cl. .................. 303/152; 303/3; 701/70
(58) Field of Search .................. 303/3, 15, 20, 303/113.1, 152, 155, DIG. 1, DIG. 2; 180/65.1, 165; 701/71, 70

(56) References Cited

U.S. PATENT DOCUMENTS

| | | | |
|---|---|---|---|
| 3,621,929 A | * 11/1971 | Oberthur et al. | ........... 180/65.1 |
| 3,774,095 A | * 11/1973 | Coccia | ........... 318/371 |
| 4,258,958 A | * 3/1981 | Bloxham | ........... 303/9.65 |
| 4,270,806 A | * 6/1981 | Venkataperumal et al. | .... 303/3 |
| 4,671,577 A | 6/1987 | Woods | |
| 5,318,355 A | 6/1994 | Asanuma et al. | |
| 5,378,053 A | * 1/1995 | Patient et al. | ........... 303/3 |
| 5,399,000 A | 3/1995 | Aoki et al. | |
| 5,421,643 A | * 6/1995 | Kircher et al. | ........... 303/3 |
| 5,433,512 A | 7/1995 | Aoki et al. | |
| 5,450,324 A | * 9/1995 | Cikanek | ........... 701/108 |
| 5,472,264 A | * 12/1995 | Klein et al. | ........... 303/3 |
| 5,511,859 A | * 4/1996 | Kade et al. | ........... 303/3 |
| 5,632,534 A | * 5/1997 | Knechtges | ........... 303/152 |
| 5,707,115 A | * 1/1998 | Bodie et al. | ........... 303/3 |
| 5,839,800 A | * 11/1998 | Koga et al. | ........... 303/152 |
| 5,853,229 A | * 12/1998 | Willmann et al. | ........... 303/3 |
| 6,033,042 A | * 3/2000 | Klemen | ........... 303/152 |
| 6,120,115 A | * 9/2000 | Manabe | ........... 303/152 |
| 6,122,588 A | * 9/2000 | Shehan et al. | ........... 701/93 |
| 6,278,916 B1 | * 8/2001 | Crombez | ........... 701/22 |

OTHER PUBLICATIONS

US 2002/0163251 A1 to Crombrez et al.*

* cited by examiner

*Primary Examiner*—Matthew C. Graham
*Assistant Examiner*—Melody M. Burch
(74) *Attorney, Agent, or Firm*—Dykema Gossett; Carlos Hanze

(57) ABSTRACT

A method and an apparatus for allowing a vehicle to be braked in both a regenerative and a distributive type or frictional manner, thereby reducing the amount of energy which is dissipated as the vehicle is braked.

3 Claims, 3 Drawing Sheets

METHOD AND AN APPARATUS FOR BRAKING A VEHICLE

BACKGROUND OF INVENTION

1. Field of the Invention

The present invention generally relates to a method and an apparatus for braking a vehicle and more particularly, to a method and an apparatus which allows a vehicle to be both regeneratively and frictionally braked, thereby allowing the vehicle to be braked in a desired manner while concomitantly allowing energy to be conserved.

2. Background of the Invention

Typically, a vehicle is selectively slowed or stopped (i.e., braked) by the use of brake assemblies which selectively and frictionally engage the wheels of the vehicle, effective to slow or stop the vehicle. While these assemblies do selectively brake or slow the vehicle, relatively large amounts of energy are lost in the form of heat as the vehicle is braked or slowed. Moreover, it is desirable to substantially prevent or reduce the likelihood of having the rear brakes become fully engaged before the front brakes achieve the same state or condition (e.g., to reduce the likelihood of premature rear brake engagement).

A second braking approach, referred to as "Electronic Brake Force Distribution" or EBD, often utilizes anti-lock braking or ABS assemblies, sensors, and values to reduce the likelihood of premature rear brake engagement by electronically and dynamically controlling the amount of braking provided by the rear and front brakes. Other more typical approaches are also used to achieve this desired braking distribution, such as by the use of a passive hydraulic proportional valve assembly. The anti-lock braking system and these other assemblies may be jointly referred to as brake distribution assemblies since they each use a dynamically created force distribution pattern which may be expressed in terms of force, torque, or power to allow a vehicle to be selectively braked in a distributive manner.

Regenerative type braking desirably and non-frictionally slows or stops the vehicle while concomitantly allowing electrical charge, or other forms of energy, to be created and stored for later use, thereby improving the overall vehicular operating efficiency while allowing the vehicle to be selectively braked. While regenerative braking is becoming more widely used, the combination of regenerative type braking and the previously delineated anti-lock or distributive braking approaches, although highly desirable, are not used since the brake distribution profiles created by these brake distribution assemblies are not modified to account for the braking effects of the regenerative braking assemblies and, as such, the combination may not provide the desired braking.

The present invention overcomes these drawbacks and provides a braking system which utilizes both regenerative and anti-lock or distributive type braking strategies and assemblies in a manner which allows for regenerative energy recovery and which allows a vehicle to be selectively braked in a desired manner while providing for the benefits associated with diverse types of braking strategies to be employed within a vehicle.

SUMMARY OF INVENTION

A vehicular braking system is provided which overcomes some or all of the previously delineated drawbacks of prior vehicular braking systems and strategies. The vehicular braking system selectively utilizes both regenerative braking and frictional braking in a manner which allows a vehicle to be selectively slowed or stopped.

According to a first aspect of the present invention a vehicular braking assembly is provided. Particularly, the assembly comprises a first regenerative braking portion; and a second frictional braking portion.

According to a second aspect of the present invention a method is provided for braking a vehicle. Particularly, the method includes the steps of requesting a certain amount of braking, fulfilling at least a portion of the certain amount of requested braking by regeneratively braking the vehicle, and frictionally braking the vehicle according to a certain distribution pattern in the event that only a portion of the certain amount of requested braking was provided by the regenerative braking, thereby fulfilling the request.

According to a third aspect of the present invention a method is provided for operating a vehicle of the type having a first pair of wheels which are operatively disposed upon a first axle, a second pair of wheels which are disposed upon a second axle, a motor which is coupled to the first axle and to a battery, the motor and battery cooperatively and selectively providing a certain amount of regenerative braking, the method comprising the steps of: creating a plurality of relationships, each of the plurality of relationships having a respective first value which is representative of a unique amount of braking of the first axle and a respective second value which is representative of a unique amount of braking of the second axle; generating a brake request signal which represents a certain amount of desired vehicular braking; using the brake request signal to select one of the plurality of relationships; comparing the first value of the selected one of the plurality of relationships with the certain amount of regenerative braking; causing a first amount of braking to be applied to the first axle and a second amount of braking to be applied to the second axle when the first value is larger than the certain amount of regenerative braking and causing a third amount of braking to be applied to the first axle and a fourth amount of braking to be applied to the second axle when the first value is smaller than the certain amount of regenerative braking.

These and other features, aspects, and advantages of the present invention will become apparent from a reading of the following description of the preferred embodiment of the invention and by reference to the following drawings.

DETAILED DESCRIPTION

Figure 1:
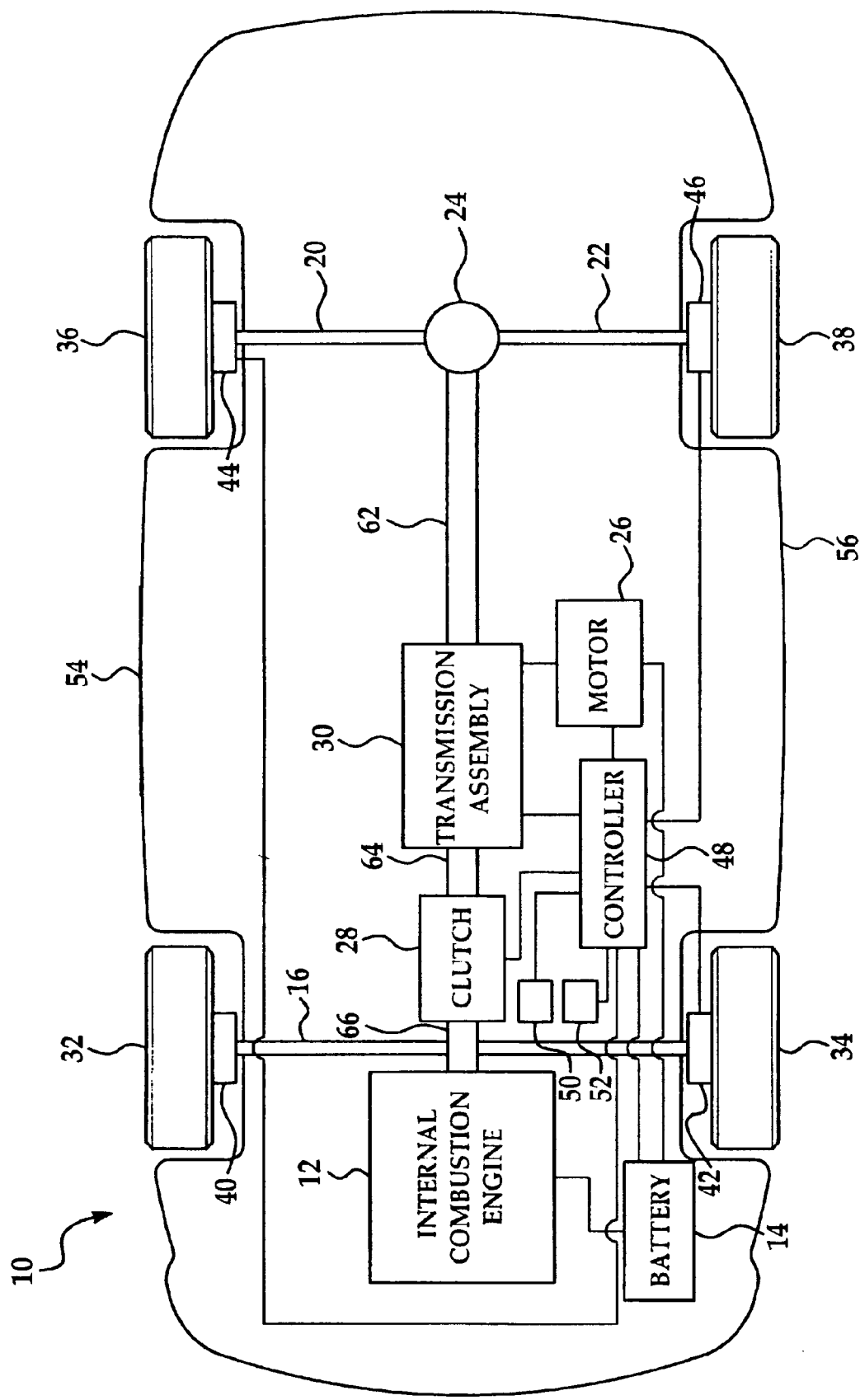
FIG. 1 is a block diagram of a vehicle incorporating a brake assembly which is made in accordance with the teachings of the preferred embodiment of the invention.

Referring now to FIG. 1, there is shown a vehicle 10 which is made in accordance with the teachings of the preferred embodiment of the invention. It should be realized that while vehicle 10 comprises a rear wheel drive type vehicle, the apparatus and methodology of the preferred embodiment of the invention may be applicable to a front wheel drive vehicle, to an all wheel drive vehicle, to a hybrid electric vehicle, and to an electric vehicle in the manner which is more fully set forth below. Moreover, it should be appreciated that only the relevant portions of vehicle 10 are shown in FIG. 1 and that the invention is applicable to a wide variety of diverse vehicular architectures.

Particularly, vehicle 10 includes a torque generator, such as but not limited to an internal combustion engine ("ICE") 12, an energy storage device, such as but not limited to an electrical battery 14, a front axle 16 (i.e., the axle below the driver of the vehicle (not shown)), a pair of rear axles or halfshafts 20, 22 (axles 20, 22 may be replaced by a single axle), a differential assembly 24, a motor 26, a clutch 28, a transmission assembly 30, a first pair of wheels 32, 34 which are operatively disposed upon opposed ends of the front axle 16, a second pair of wheels 36, 38 which are respectively disposed upon rear axles 20, 22, and frictional brake assemblies 40, 42, 44, and 46 which are respectively and operatively disposed upon wheels 32, 34, 36, and 38. Brake assemblies 40, 42, 44 and 46 may be of the anti-lock type. Vehicle 10 further includes a controller or control assembly 48, a selectively depressible brake pedal member 50 and a selectively depressible acceleration pedal or member 52 which are each physically and communicatively coupled to the controller or control assembly 48. Controller 48 may comprise or form a computer controller which is operable under stored program control and, in one alternate nonlimiting embodiment, may comprise multiple controllers which are in a communicative relationship (i.e., there may be a brake controller, a powertrain controller, and a battery controller communicatively coupled to each other by at least one electrical bus). The combination of the controller 48 and the brake assemblies 40, 42, 44 and 46 cooperatively comprise the brake assembly of the preferred embodiment of the invention. Vehicle 10 further includes frame members 54, 56 which are respectively coupled to the axles 16, 20; and 16, 22. It should further be realized that storage device 14 may be replaced with a flywheel or other storage assembly and that axles 20, 22 cooperatively form a driven axle while front axle 16 forms a passive or non-driven axle. Moreover, as is further shown, internal combustion engine 12 is coupled to the clutch 28 by powertrain member 66, and the transmission 30 is coupled to the differential assembly 24 and to the clutch 28 by respective powertrain members 62, 64.

As shown, controller 48 is operatively coupled to the brake assemblies 40–46. Brake assemblies 40–46 also, for example and without limitation, may comprise a hydraulic braking system which may be controlled by controller 48 by the use of a hydraulic actuator (not shown). Further, controller 48 is operatively coupled to the battery 14, to the clutch 28, to the motor 26, and to the transmission assembly 30. The motor 26 is also coupled to the transmission assembly 30 and the storage device 14.

In operation, torque generator 12 provides torque which is communicated to the differential 24 through the clutch 28, transmission 30, and powertrain members 66, 64 and 62. The torque causes the axles 20, 22 to rotate and allows the vehicle 10 to be driven and selectively propelled. As is more fully delineated below with respect to the methodology or flowchart 90, a desire or demand to slow or stop (e.g., brake) the vehicle 10 is received by the controller 48 after the brake member 50 has been depressed and/or after the accelerator member 52 has been lifted. The amount of such depression or lifting corresponds to a certain brake request (e.g., a certain amount of braking force, torque, or power), and this request is communicated to the controller 48 by respective pedal or member sensors (not shown). For example, the top position of the brake member 50 may correspond to a braking amount of zero, the bottom or lowest depressed position of the brake member 50 may correspond to the maximum amount of allowable braking, and the requested braking amount may vary, as the member 50 is depressed, by an amount proportional to the distance that the brake member 50 moves from the top position to the bottom position (e.g., when the member 50 resides half-way between the top and bottom positions, the requested braking amount is one-half of the total allowable braking amount). A similar proportionality applies to the accelerator member 52. That is, as the member 52 is moved from the bottom position (no braking is requested) to the top position (the vehicle is given no acceleration), the amount of requested braking or slowing of the vehicle 10 proportionally increases in proportion to the amount of distance traveled by the member 52 and/or to the position occupied by the member 52.

The controller 48, upon receipt of movement signals from members 50, 52, generates signals to the motor 26 and to the transmission assembly 30 which is coupled to powertrain member 62, thereby causing the motor 26 to function as a generator and place electrical charge within the battery 14 in order to regeneratively brake the vehicle 10. That is, motor 26 uses the rotational energy of the member 62 to generate electrical energy and to thereby reduce the rotational energy of the wheels 36, 38. Additionally, controller 48 may also generate and send signals to motor 26 to use electrical energy stored within battery 14 to supplement the torque provided by the internal combustion engine 12 during acceleration (e.g., when accelerator member 52 is depressed) by providing additional torque to powertrain member 62. In the preferred embodiment of the invention, only when additional braking is desired (i.e., an amount of braking which exceeds the amount of braking provided by regeneration), does the controller 48 selectively activate the frictional braking assemblies 40–46 according to a previously created and stored brake distribution pattern, which accounts for the regenerative braking supplied by motor 26, thereby allowing for a desired amount of braking to be achieved while concomitantly allowing energy to be conserved. The methodology of the preferred embodiment of the invention will now be explained in greater detail below with respect to flowchart 90 of FIG. 2.

As shown, methodology 90 includes a first step 92 in which controller 48 receives a braking request from members 50, 52 (or from sensors which are respectively attached to these members 50, 52). Step 94 follows step 92 and, in this step 94, the controller 48 determines the amount of braking torque, force, or power which is required, or desired, by the driver based upon the position of the requesting members 50, 52. In alternative embodiments, the vehicle 10 may include other brake request members or assemblies. The desired amount of braking torque is temporarily stored in controller 48 for use in subsequent steps of methodology 90.

Figure 3:
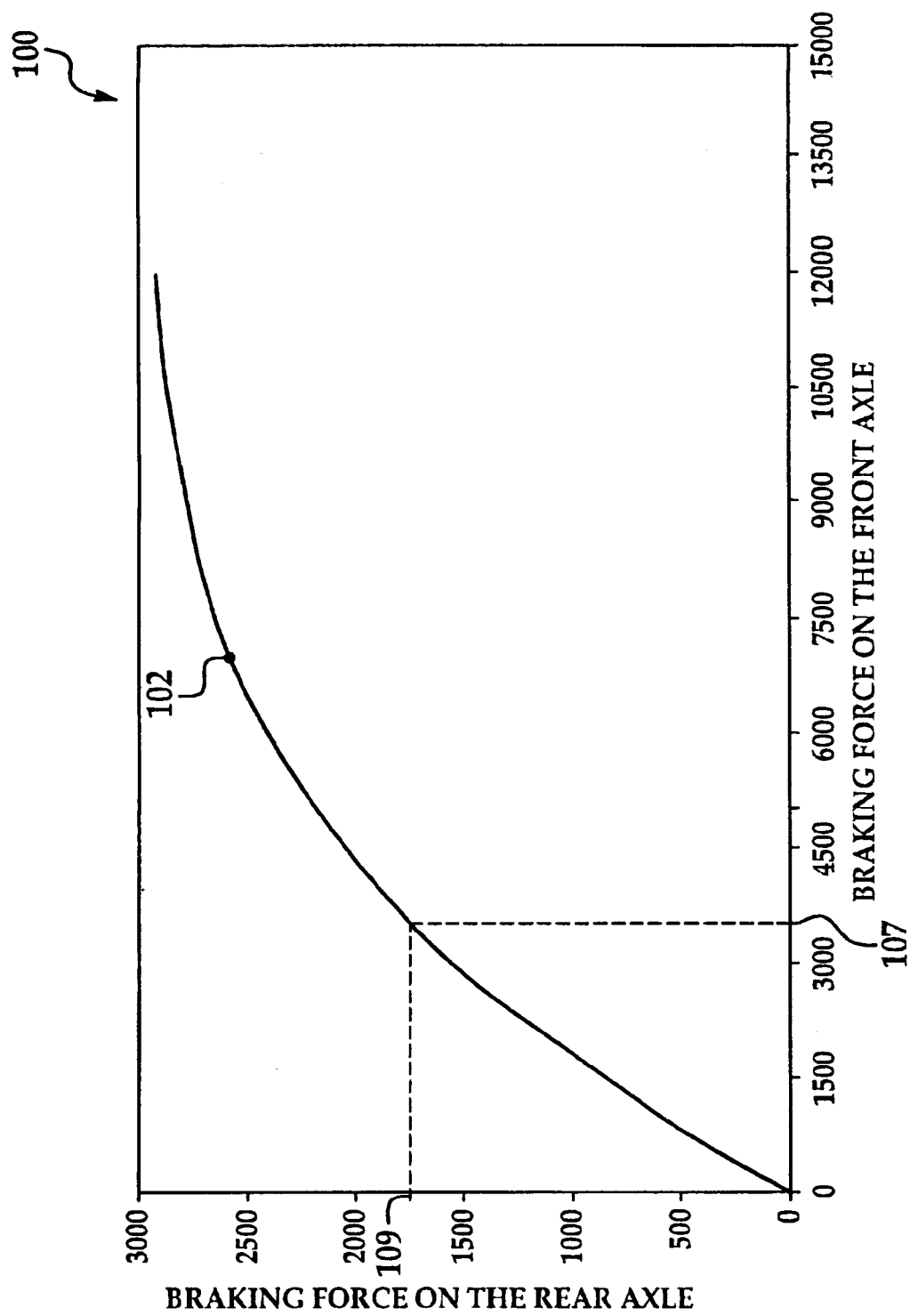
FIG. 3 is a graph of a typical brake distribution relationship which is used by the brake assembly of the preferred embodiment of the invention.

Step 95 follows step 94 and, in this step 95, controller 48 determines the maximum provided or available amount of regenerative braking torque that the motor 26 and battery 14 can generate or provide (i.e., the regenerative braking limit is the lesser of the maximum amount of torque that the motor 26 may generate and the maximum amount of electrical energy that the battery 14 will accept from motor 26). This amount may be related to such factors as battery temperature, motor temperature, battery state of charge, and/or a variety of other factors. For example, and without limitation, the current state of charge of the battery may be compared to the known and maximum state of charge which may be contained within the battery (e.g., which may be obtained from the battery manufacturer) and this difference may represent the maximum amount of electrical energy which may be accepted by the battery 14. The maximum amount of torque provided by the motor 26 may be acquired by the manufacturer of the motor 26 and stored within controller 48. These values may change with temperature and other factors. Controller 48 temporarily stores the regenerative braking torque limit for subsequent steps in methodology 90. Step 94 is also followed by step 96 in which the controller 48 accesses the previously created (or dynamically calculated) and stored brake force (or torque or power) distribution 100 which is shown by way of example and without limitation, in FIG. 3.

Particularly, distribution 100 includes several relationships or values, such as relationship 102, which provides a certain desired pattern of the required stopping or slowing force. Each discrete point on relationship 102 includes a braking value for the front axle 16 (i.e., for brake assembles 40, 42), such as value 107, and a braking value for the rear axles 20, 22 (i.e., for braking assemblies 44, 46), such as value 109, and the sum of these two values, such as values 107, 109, substantially equals the total requested braking amount which may be expressed in terms of torque, force, or power. This relationship 102 may be created for each unique type of vehicle 10 based upon theoretical or experimental data in which certain known or predetermined total braking amounts are sequentially requested of the vehicle 10. Different braking ratios between the front and rear assemblies 40, 42 and 44, 46, for each such braking request, are applied/utilized and reviewed, and a single desired ratio or proportion is chosen for each requested amount of braking. These chosen ratios are stored within controller 48, thereby forming a distribution including relationship 102. For example, relationship 102 was created for a typical front wheel drive vehicle weighing 1500 kg with a front to rear weight ratio or proportionality of approximately 60% and 40%. As shown, by way of example and without limitation, when the total required braking force is about 4500 Newtons, it is desired to have about 3000 Newtons provided by the front brakes 40, 42 and about 1500 Newtons provided by the rear brakes 44, 46. Moreover these ratios or proportionalities may also be developed by conventional techniques which are currently used by conventional and commercially available anti-lock braking assemblies. Hence, in step 96, controller 48 uses the total requested braking value and determines, from the graph or brake force relationship 102, the amount of desired front and rear braking force which must be created. Controller 48 temporarily stores these driven axle and passive axle brake relationships for subsequent steps in methodology 90.

Step 98 also follows step 94 and, in this step 98, the controller 48 determines whether the total amount of requested braking exceeds the amount which may be solely provided by regeneration. If the amount of requested braking exceeds the regeneration limit determined in step 95, step 98 is followed by step 106. Alternatively, step 98 is followed by step 110 in which the controller 48 causes the motor 26 to act as a generator and to provide electrical charge to the battery 14 and to therefore cooperate with the battery 14 to regeneratively brake the vehicle 10 by the requested amount. Steps 111 and 113 follow step 110 in which braking assemblies 40, 42 and 44, 46 remain respectively deactivated (i.e., both the driven axles 20, 22 and the passive axle 16 are not subject to frictional braking torque). Alternatively, in another non-limiting embodiment, steps 111 and 113 may sequentially occur, as shown. Step 113 is followed by step 92 in which the controller 48 determines whether additional braking is required. The methodology 90, in the most preferred, although non-limiting embodiment, is adapted to be accomplished one within each control loop of the processor or controller 48.

In step 106, the controller 48 determines whether the desired value of the torque of the driven axles 20, 22 (e.g., the value 109 which is determined in step 96) exceeds the amount of braking which is provided by regeneration. If the desired value of the torque of the driven axle(s) exceeds that provided by regeneration, then step 106 is followed by step 114. Alternatively, step 106 is followed by step 116 in which the controller 48 causes the motor 26 to supply a maximum amount of electrical charge to the battery 14 and to thereby provide the maximum allowable amount of regenerative braking. Step 116 is followed by step 118 in which brake assemblies 44, 46 remain substantially deactivated (i.e., all braking applied to drive axles 20, 22 is accomplished by regenerative braking), and step 118 is followed by step 120 in which the brake assemblies 40, 42 are activated. Particularly, brake assemblies 40, 42 provide a certain amount of braking which is substantially equal to the difference between the requested amount of braking (as determined in step 94) and the total allowable regenerative braking available (as determined in step 95). Step 120 is followed by step 92.

Step 114 is substantially similar to step 116 and step 114 is followed by step 130 in which brake assemblies 44, 46 are activated to provide a certain amount of braking which is equal to the difference between the desired amount of braking of the driven axles 20, 22 (e.g., value 107) and the total amount of allowable regenerative braking. Step 130 is followed by step 132 in which the braking assemblies 40, 42 are activated and provide a certain amount of braking which is equal to the desired non-driven axle braking value (e.g., value 107). Step 132 is followed by step 92. In this manner, both regenerative and frictional braking may be concurrently employed within vehicle 10, thereby allowing the vehicle 10 to have the benefits of both types of braking functionalities.

Figure 2:
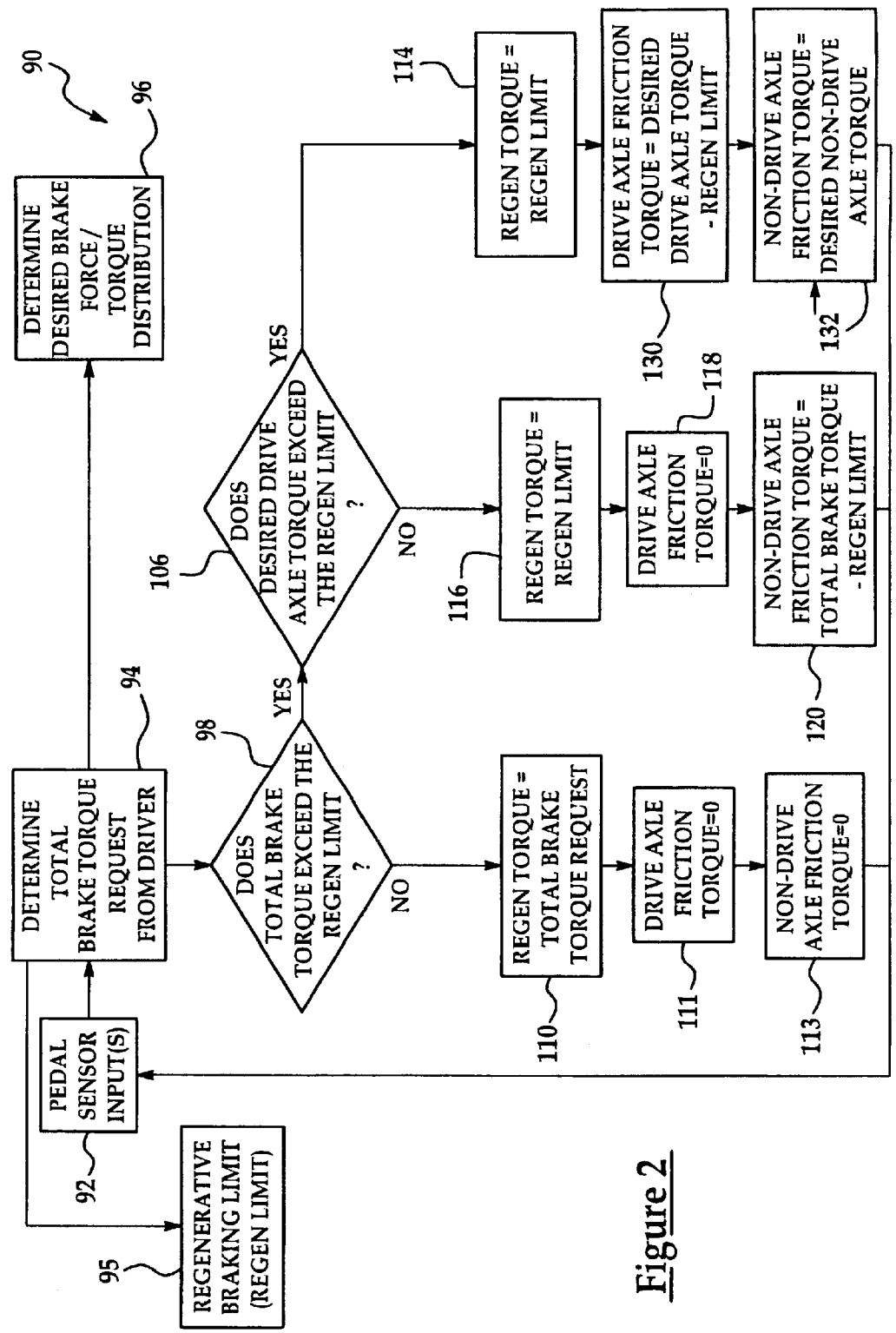
FIG. 2 is a flowchart including a sequence of operational steps which cooperatively comprises the methodology of the preferred embodiment of the invention.

In a second embodiment, conventional anti-lock brake control assemblies may be used and, in this second embodiment, steps 92, 94, 95, 96, 98 and 110, 111 and 113 remain substantially identical to that which is shown in FIG. 2. However, steps 106, 114, 116, 118, 120, 130, and 132 are replaced by a step of frictionally braking the non-driven axle 16 until a threshold of locking is sensed or until a certain amount of braking is accomplished and then allowing the anti-lock braking system to become activated and to perform its normal electronic brake force distribution or (EBD) function/operation.

It is to be understood that the invention is not limited to the exact construction or method which has been illustrated and discussed above, but that various changes and modifications may be made without departing from the spirit and the scope of the inventions as are delineated in the following claims. It should further be appreciated that controller 48 may be used in combination with a conventional motor 26, brake assemblies 40–46, and battery 14 which may be operatively disposed within a conventional vehicle 10. Alternatively, controller 48, clutch 28, motor 26, and battery 14 may cooperatively form a brake control assembly which may be deployed within an existing vehicle 10 and, more particularly, motor 26 and battery 14 cooperate with assembly 30 to form a regeneration assembly.

What is claimed is:

1. A method for operating a vehicle of the type having a first pair of wheels which are operatively disposed upon a first axle, a second pair of wheels which are disposed upon a second axle, a motor which is coupled to said first axle and to a battery, said motor and battery cooperatively and selectively providing a certain amount of regenerative braking, said method comprising the steps of:

creating a plurality of relationships, each of said plurality of relationships having a respective first value which is representative of a unique amount of braking of said first axle and a respective second value which is representative of a unique amount of braking of said second axle;

generating a brake request signal which represents a certain amount of desired vehicular braking;

using said brake request signal to select one of said plurality of relationships;

comparing said first value of said selected one of said plurality of relationships with said certain amount of regenerative braking;

causing a first amount of braking, comprising a value equal to the difference between said first value and said certain amount of regenerative braking, to be applied to said first axle and a second amount of braking, comprising said second value, to be applied to said second axle when said first value is larger than said certain amount of regenerative braking and causing a third amount of braking, comprising a null amount, to be applied to said first axle and a fourth amount of braking, comprising the difference between said certain amount of desired vehicular braking and said certain amount of regenerative braking, to be applied to said second axle when said first value is smaller than said certain amount of regenerative braking.

2. The method of claim 1 wherein said first, second, and fourth amounts of braking are achieved by the use of frictional distributive braking.

3. The method of claim 1 further comprising the step of comparing said certain amount of desired vehicular braking and said certain amount of regenerative braking; and causing all of said certain amount of desired vehicular braking to be achieved only by regenerative braking if said certain amount of regenerative braking is greater than said certain amount of desired vehicular braking.

* * * * *